JOHN E. BYERS.
Improvement in Cultivators.
No. 124,329.   Patented March 5, 1872.
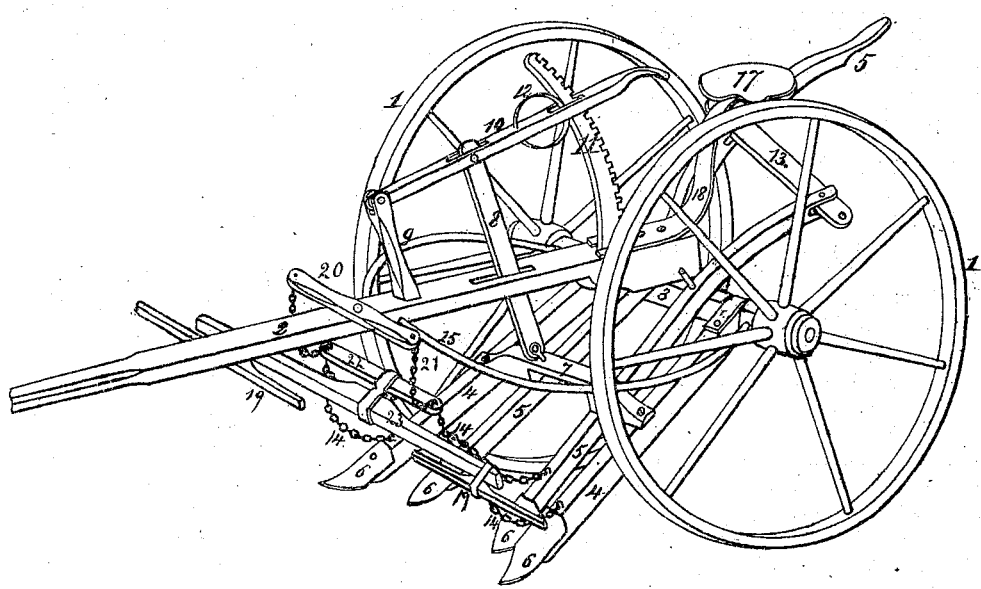

UNITED STATES PATENT OFFICE.

JOHN E. BYERS, OF BUTLER, PENNSYLVANIA.

IMPROVEMENT IN CULTIVATORS.

Specification forming part of Letters Patent No. 124,329, dated March 5, 1872.

*To all whom it may concern:*

Be it known that I, JOHN E. BYERS, of Butler, in the county of Butler and State of Pennsylvania, have invented a new and valuable Improvement in a Corn and Cotton Cultivator; and I do hereby declare that the following is a full, clear, and exact description of the construction and operation of the same, reference being had to the annexed drawing making a part of this specification and to the letters and figures of reference marked thereon.

The drawing represents a perspective view of my cultivator.

My invention relates to machinery for cultivating growing plants of corn or cotton; and consists in the novel construction and combination of devices as hereinafter described and claimed.

No. 1 upon the drawing represents the wheels of a sulky cultivator; No. 2, the tongue; No. 3, the axle; No. 4, the outside plow-beams; No. 5, the inside plow-beams; No. 6, the shovel-plows; No. 7, a cross-bar rigidly connected with the outer beams, and to which the inside beams are pivoted so as to allow them to be moved or swung thereon to the right or left, at will, and thereby be made to cultivate as closely to the plants as may be desired. No. 8 represents an upright standard, pivoted to the bar No. 7 at its lower end. It passes through a slot in the tongue of the carriage, and its upper end is pivoted in a slot formed in the elevating lever No. 10, as shown. No. 9 is an upright post, rigidly attached to the carriage-tongue; and No. 10 is a lever, the front end of which is pivoted to the top of post 9, while its rear end is constructed to form a handle near the driver's seat. No. 11 is a ratchet-bar, attached to the tongue, as shown, and passes upward through a slot in the lever No. 10. No. 12 is a spring, operating against the ratchet-bar 11, and serves to press it against an engaging-pin, or other similar device in the slot through which it passes. No. 13 represents a cross-bar, pivoted to the ends of the inner plow-beams; and No. 17 is the driver's seat. No. 20 represents a bar, arranged upon the tongue, to which a chain, 21, is suspended at each end. No. 22 is a swinging bar, connected at each end with the bar 20 by means of the chains 21. No. 23 represents a double-tree, connected with the bar 22 by the link 24; and No. 19 are the single-trees. No. 14 represents double or brace-chains, the upper ends of which are united and attached to the swinging bar 22, while the lower ends are connected respectively with the outer and inner plow-beams, as shown. One set of these chains is connected to the two left-hand beams, and another set to the two right-hand beams.

The depth of furrow is regulated by the elevating-lever and ratchet-bar. By lowering the near end of said lever the furrow is deepened, while by raising it, the depth of furrow is lessened. By the operation of the chains 14 and 21, and the cross-bar 20, together with the bar 22, the draft can be made directly upon the front ends of the plow-beams and near the plows, while said devices, in conjunction with the lever 10 and the ratchet 11, enable the operator to raise the plows from the ground at will, for purposes of transportation.

I claim as my invention—

The combination of the bars 20 and 22, double-tree 23, and chains 14 and 21, and plow-beams 4 and 5, substantially as and for the purpose specified.

In testimony that I claim the above I have hereunto subscribed my name in the presence of two witnesses.

JOHN E. BYERS.

Witnesses:
 R. M. M. LANE,
 MOSES SULLIVAN.